United States Patent
Kim et al.

(10) Patent No.: US 8,833,853 B2
(45) Date of Patent: Sep. 16, 2014

(54) SEAT FOR VEHICLE

(75) Inventors: Bong Ku Kim, Hwaseong-si (KR); Sang Ho Kim, Incheon (KR); Chan Ho Jeong, Seoul (KR); Sang Do Park, Ansan-si (KR); Hak Gyun Kim, Hwaseong-si (KR); Deok Soo Lim, Hwaseong-si (KR); Ji Hyun Kim, Anyang-si (KR); Tae Hoon Lee, Hwaseong-si (KR); Soo Hyun Moon, Suwon-si (KR); Jun Yeol Heo, Suwon-si (KR); Jong Kweon Pyun, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 364 days.

(21) Appl. No.: 13/316,528

(22) Filed: Dec. 11, 2011

(65) Prior Publication Data

US 2012/0228910 A1 Sep. 13, 2012

(30) Foreign Application Priority Data

Mar. 10, 2011 (KR) ................. 10-2011-0021281

(51) Int. Cl.
| | |
|---|---|
| *B60N 2/14* | (2006.01) |
| *B60N 2/20* | (2006.01) |
| *B60N 2/01* | (2006.01) |
| *B60N 2/30* | (2006.01) |
| *B60N 2/18* | (2006.01) |
| *B60N 2/36* | (2006.01) |
| *B60N 2/235* | (2006.01) |
| *B60N 2/06* | (2006.01) |

(52) U.S. Cl.
CPC ............. *B60N 2/065* (2013.01); *B60N 2/3011* (2013.01); *B60N 2/1803* (2013.01); *B60N 2/1842* (2013.01); *B60N 2205/35* (2013.01); *B60N 2/366* (2013.01); *B60N 2/2356* (2013.01); *B60N 2/3065* (2013.01); *B60N 2/185* (2013.01)
USPC ........... 297/240; 297/248; 297/316; 297/333; 297/334; 297/341

(58) Field of Classification Search
USPC ......... 297/234, 240, 248, 257, 316, 317, 333, 297/341, 344.1, 344.14, 378.12–378.14, 297/232, 331, 334
See application file for complete search history.

(56) References Cited

U.S. PATENT DOCUMENTS

| | | | | |
|---|---|---|---|---|
| 4,971,395 | A * | 11/1990 | Coussemacq et al. | 297/378.1 |
| 6,293,603 | B1 * | 9/2001 | Waku et al. | 296/65.09 |
| 6,733,078 | B1 * | 5/2004 | Zelmanov | 297/378.1 |
| 8,590,970 | B2 * | 11/2013 | Takakura et al. | 297/334 |
| 2008/0203796 | A1 * | 8/2008 | Picker et al. | 297/341 |
| 2010/0007188 | A1 * | 1/2010 | Yamada et al. | 297/257 |

* cited by examiner

*Primary Examiner* — David R Dunn
*Assistant Examiner* — Timothy J Brindley
(74) *Attorney, Agent, or Firm* — Morgan, Lewis & Bockius LLP

(57) ABSTRACT

A seat for a vehicle constructed so that a side seat is provided on an opposite side of a center seat may include a first hinge shaft to which a center seat back of the center seat may be rotatably coupled for folding the center seat back forwards, a second hinge shaft to which a side seat back of the side seat may be rotatably coupled for folding the side seat back forwards, and a folding actuator assembly selectively engaging the side seat back with the center seat back, wherein the folding actuator assembly locks the center seat back to the side seat back when the side seat back may be folded, and releases the center seat back from the side seat back to fold only the center seat back when the center seat back may be folded.

12 Claims, 8 Drawing Sheets

SEAT FOR VEHICLE

CROSS-REFERENCE TO RELATED APPLICATIONS

The present application claims priority to Korean Patent Application No. 10-2011-0021281 filed on Mar. 10, 2011, the entire contents of which is incorporated herein for purposes by this reference.

BACKGROUND OF THE INVENTION

1. Field of the Invention

The present invention relates generally to second row seats for recreational vehicles (RVs) and, more particularly, to a seat for a vehicle, which is constructed so that a center seat is folded together with a side seat and a dive operation is simultaneously carried out when the side seat is folded, and only the center seat is folded in the case of folding the center seat.

2. Description of Related Art

Generally, seats for RVs include a first row seat which corresponds to a driver's seat and a front passenger seat, and a second row seat and a third row seat which are arranged behind the first row seat.

Among them, the second row seat is constructed so that side seats 2 are provided on the left and right sides of a center seat 1, as shown in FIG. 1. In order to facilitate a passenger getting in and out of a vehicle and to load goods, a center seat back 1a and side seat backs 2a rotate forwards to be folded.

However, as shown in FIG. 2, the conventional second row seat is generally constructed so that the center seat back 1a and the side seat backs 2a are folded along one common hinge shaft 3. The use of the one common hinge shaft 3 is advantageous in that the number of parts can be reduced. However, it has the drawback in that a dive operation of a seat cushion 4 is impossible. A "dive operation" refers the operation whereby the seat cushion is moved forwards and downwards.

As such, if the dive operation of the seat cushion 4 is impossible when the seat back is folded, a height H1 from a floor panel to an upper surface of the folded seat back increases, thus making it difficult to load goods.

Further, if the seat is constructed to simultaneously perform the folding operation of the seat back and the dive operation of the seat cushion, the dive operation of the seat cushion 4 is performed even when only the center seat back 1a is folded as shown in FIG. 3, so that the riding comfort for an occupant sitting in the side seat 2a becomes poor.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a seat for a vehicle, which is constructed so that a center seat back is folded together with a side seat back and simultaneously a seat cushion performs a dive operation when the side seat back is folded, and only the center seat back is folded in the case of folding the center seat back, thus considerably improving the riding comfort for an occupant sitting in a side seat.

In an aspect of the present invention, the seat for a vehicle constructed so that a side seat may be provided on an opposite side of a center seat may include a first hinge shaft to which a center seat back of the center seat may be rotatably coupled for folding the center seat back forwards, a second hinge shaft to which a side seat back of the side seat may be rotatably coupled for folding the side seat back forwards, and a folding actuator assembly selectively engaging the side seat back with the center seat back, wherein the folding actuator assembly locks the center seat back to the side seat back when the side seat back may be folded, and releases the center seat back from the side seat back to fold only the center seat back when the center seat back may be folded.

The first hinge shaft may be rotatably coupled to a center bracket formed to the center seat bracket, a side bracket formed to the side seat back, and a seat cushion bracket formed to the seat cushion.

The seat cushion bracket may be inserted between the center bracket and the side bracket.

The seat cushion bracket may be integrated with the seat cushion, and the seat cushion bracket may be bent at a rear portion thereof upwards and then extends with a predetermined length to be inserted between the center bracket and the side bracket formed to a lower side of the side seat back.

The first hinge shaft and the second hinge may not be disposed co-axial.

The first hinge shaft may be located behind and above the second hinge shaft with a predetermined distance.

The folding actuator assembly may include an actuating recess formed in an upper side of the center seat back, and an actuating pin provided on an upper side of the side seat back, a first end thereof being selectively inserted into the actuating recess, wherein the actuating recess may be formed in the upper side of the center seat back and located above the first hinge shaft, wherein a rear portion of the actuating recess may be open and a front portion thereof may be closed to selectively receive the first end of the actuating pin through the rear portion of the actuating recess, and wherein, when the center seat back may be folded forwards with respect to the side seat, the front end of the actuating pin may be removed from the actuating recess through the open rear portion thereof, and when the side seat back may be folded forwards, the front end of the actuating pin comes into contact with the closed front portion of the actuating recess so that the side seat and the center seat may be folded together.

A pin bracket may be secured to the upper side of the side seat back which faces the actuating recess, and the actuating pin may be coupled to the pin bracket and a length of the actuating pin protruding from the pin bracket may be adjustable, wherein an end of the pin bracket may be threaded and secured to the upper side of the side seat back.

A dive actuator may be mounted to a seat rail between the seat rail and a seat cushion, the dive actuator being actuated to unlock the seat cushion from the seat rail when the seat cushion moves forwards while both the side seat back and the center seat back may be folded together, wherein the dive actuator may include a dive locking unit mounted to the seat rail, and a dive bracket rotatably coupled at a first end thereof to the dive locking unit and rotatably coupled at a second end thereof to a front portion of the seat cushion, thus releasing a locked state of the dive locking unit when the seat cushion moves forwards while both the side seat back and the center seat back may be folded together.

The dive locking unit may include a housing having gear teeth formed in an inner circumference thereof, a cam lever fixed to the first end of the dive bracket and rotatably engaged to the housing, a pawl teeth member having gear teeth and engaged between the inner surface of the housing and the cam lever, and a rotational center protrusion formed in the inner circumference of the housing, wherein the pawl teeth member may be pivotally engaged with the rotational center protrusion, and wherein the cam lever selectively rotates the pawl teeth member while the cam lever may be rotated by the dive bracket.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
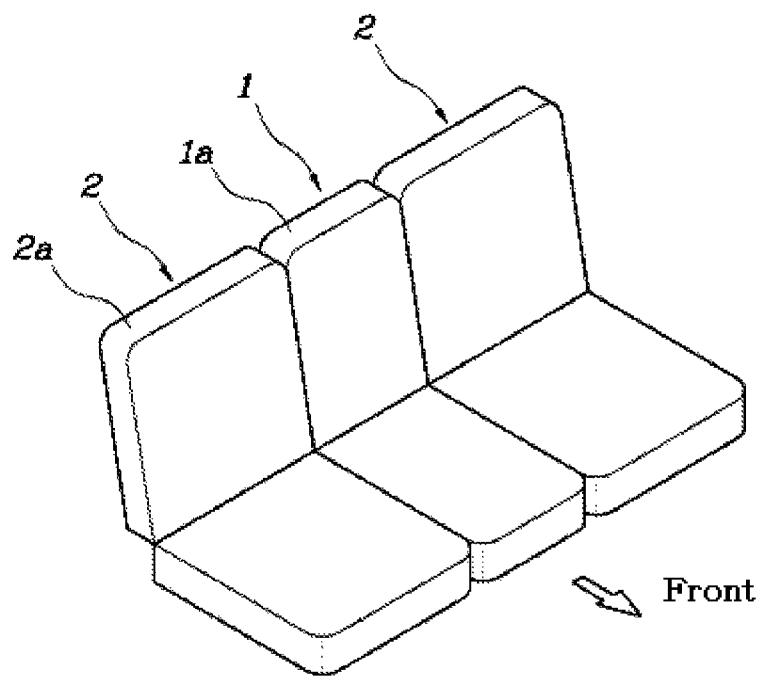
FIG. 1 is a perspective view showing a conventional second row seat for an RV.
Figure 2:
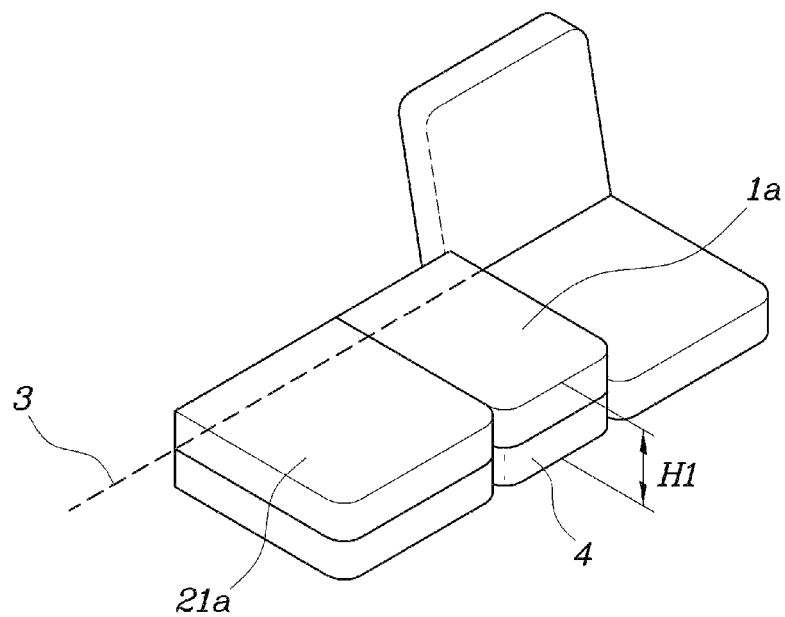
FIGS. 2 and 3 are perspective views illustrating a conventional second row seat.
Figure 3:
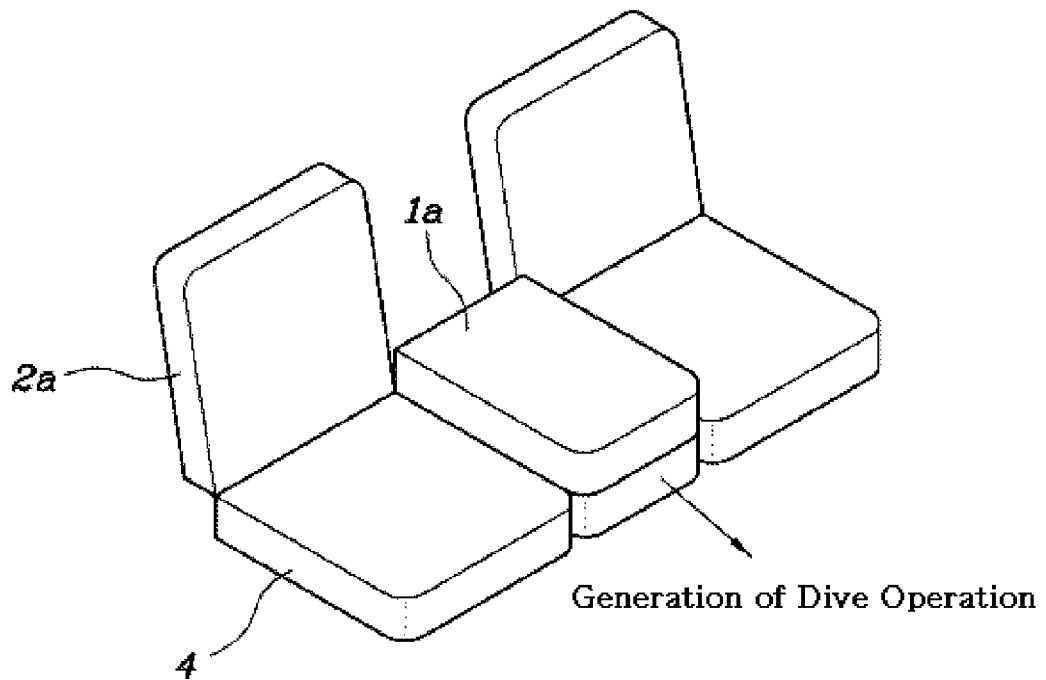

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF PREFERRED EMBODIMENTS

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an embodiment of the present invention will be described in detail with reference to the accompanying drawings.

Figure 4:
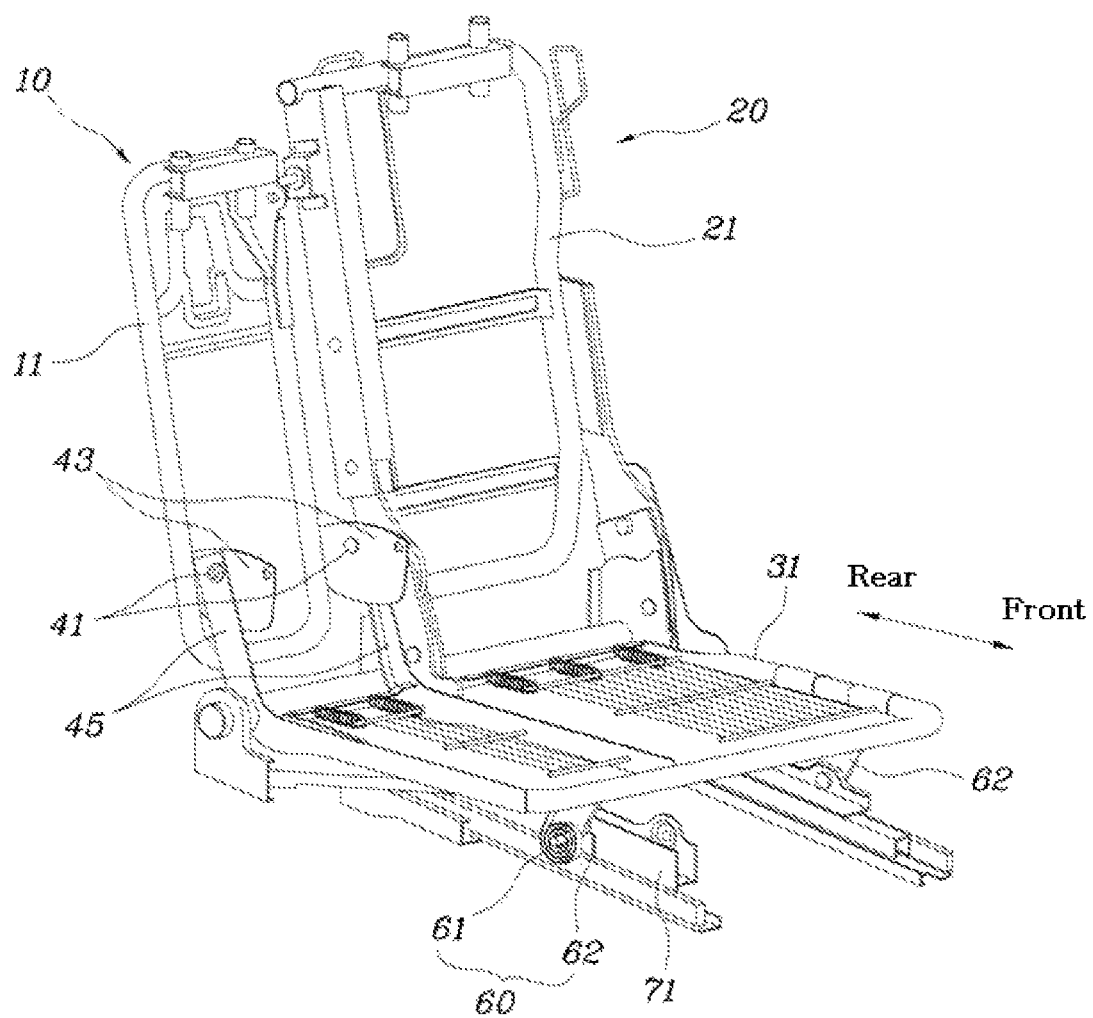
FIGS. 4 to 6 are perspective views showing a second row seat for an RV according to an exemplary embodiment of the present invention.
Figure 5:
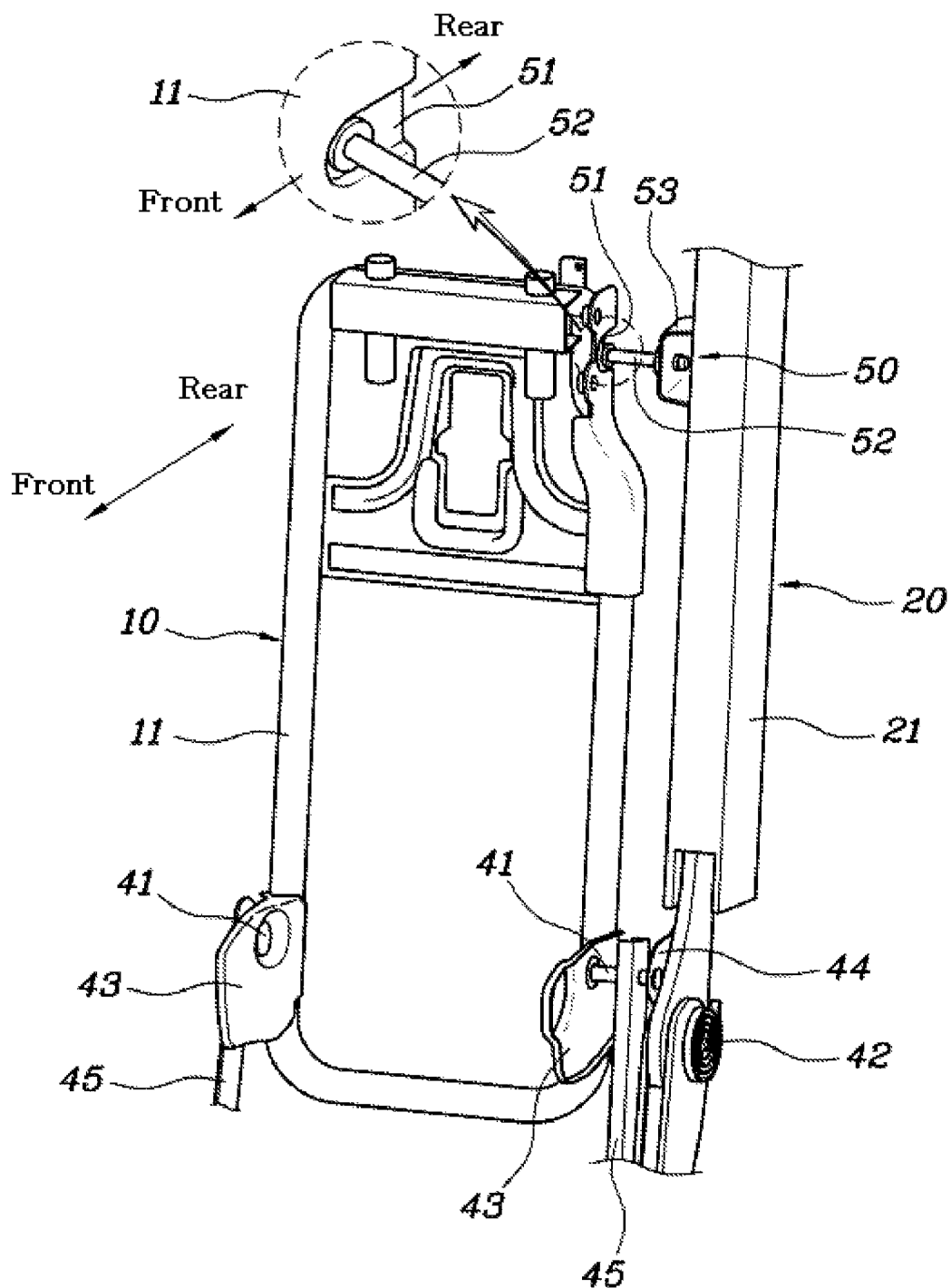
Figure 6:
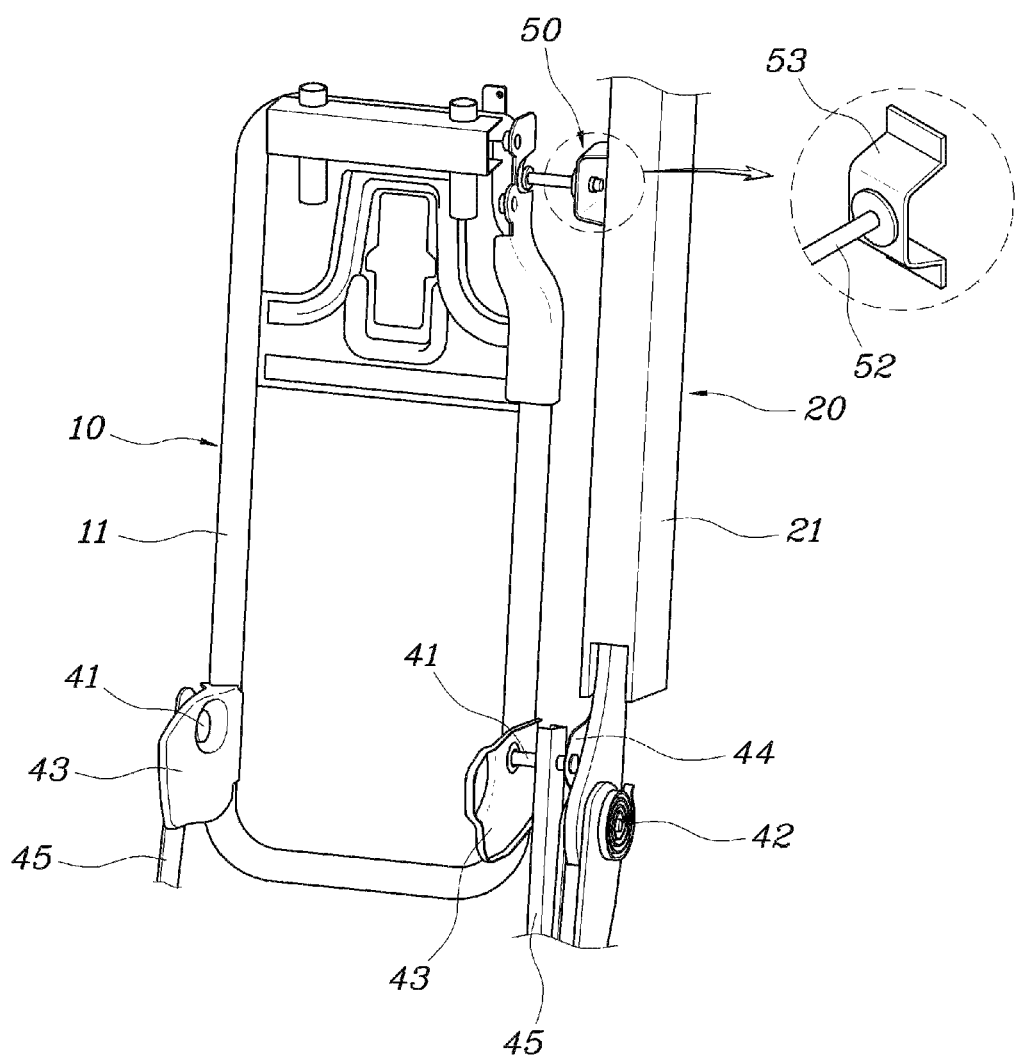

As shown in FIGS. 4 to 6, a second row seat for an RV according to the exemplary embodiment of the present invention is constructed so that side seats 20 are placed on left and right sides of a center seat 10. In order to facilitate a passenger getting in and out of the vehicle and to load goods, a center seat back 11 and side seat backs 21 rotate forwards to be folded.

Further, the second row seat according to an exemplary embodiment of the present invention is constructed so that the center seat back 11 is folded together with the side seat back 21 and simultaneously a seat cushion 31 performs a dive operation when each side seat back 21 is folded, and only the center seat back 11 is folded in the case of folding the center seat back 11.

To this end, first hinge shafts 41 for folding the center seat back 11 and second hinge shafts 42 for folding the side seat backs 21 are provided. Further, a folding actuator assembly 50 is provided to fold the center seat back 11 together with the side seat back 21 when each side seat back 21 is folded, and to fold only the center seat back 11 when the center seat back 11 is folded. A dive actuator 60 is provided to cause the dive operation of the seat cushion 31 to be simultaneously performed only when both the side seat back 21 and the center seat back 11 are folded together.

Here, the first hinge shaft 41 is located at a position which is behind and above the second hinge shaft 42, and passes integrally through upper ends of a center bracket 43, a side bracket 44, and a seat cushion bracket 45 in such a way as to freely rotate. The center bracket 43 is coupled to the center seat back 11. The side bracket 44 is coupled to the side seat back 21. The seat cushion bracket 45 is inserted between the center bracket 43 and the side bracket 44.

Meanwhile, the seat cushion bracket 45 is integrated with the seat cushion 31, and is constructed so that a rear portion of the seat cushion bracket 45 is bent upwards and extends to be inserted between the center bracket 43 and the side bracket 44.

Further, the folding actuator assembly 50 includes an actuating recess 51 and an actuating pin 52. The actuating recess 51 is located above the first hinge shaft 41, is formed on a side of the center seat back 11, and is shaped to be open at a rear thereof and be closed at a front thereof. One end of the actuating pin 52 is secured to a side of the side seat back 21 facing the actuating recess 51, while the other end is inserted into the actuating recess 51.

That is, a pin bracket 53 is mounted to the side of the side seat back 21 facing the actuating recess 51, with the actuating pin 52 being coupled to the pin bracket 53. The actuating pin 52 is installed such that its length protruding from the pin bracket 53 is adjustable. In an exemplary embodiment of the present invention, an end of the pin bracket 53 is threaded and engaged to the pin bracket 53 so as to adjust the length protruding thereof.

Further, the dive actuator 60 includes a dive locking unit 61 and a dive bracket 62. The dive locking unit 61 is mounted to each seat rail 71. The dive bracket 62 is rotatably coupled at one end thereof to the dive locking unit 61 and rotatably coupled at the other end to a front portion of the seat cushion 31 so as to release the locked state of the dive locking unit 61 when the seat cushion 31 moves forwards while the side seat back 21 and the center seat back 11 are being folded together.

Figure 7:
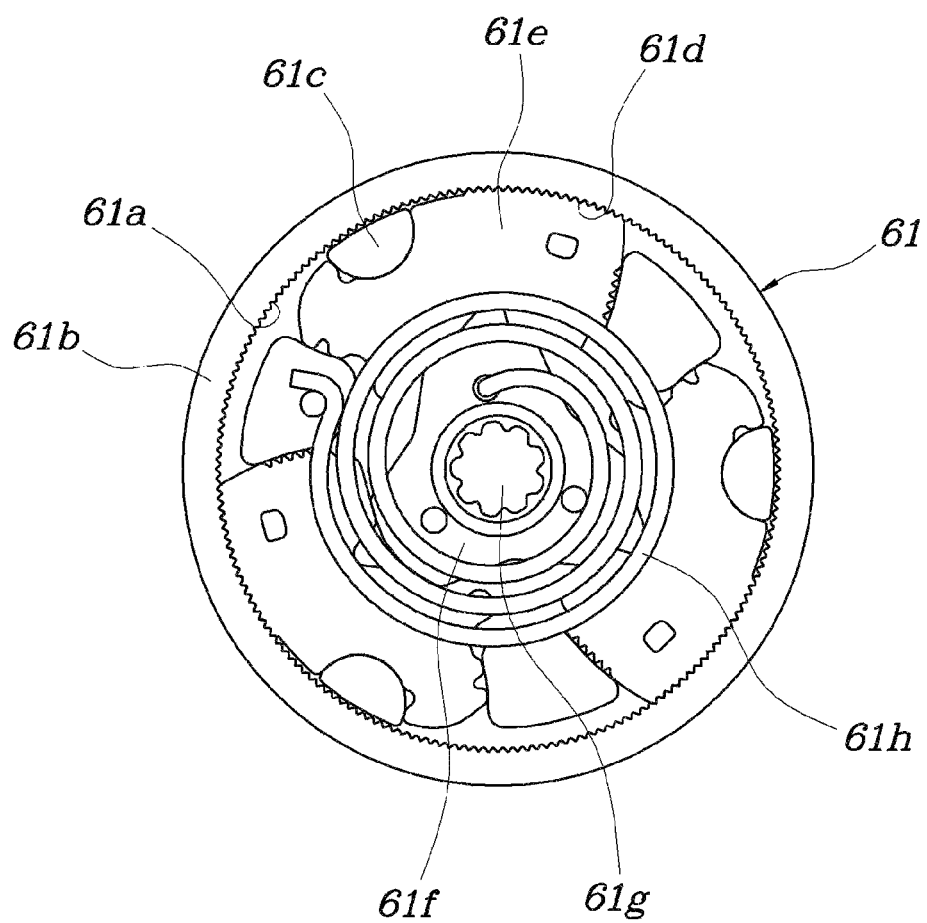
FIG. 7 is a view showing an exemplary dive locking unit.

Meanwhile, FIG. 7 shows the internal construction of an exemplary dive locking unit 61. The dive locking unit 61 includes a housing 61b, rotational center protrusions 61c, pawl teeth member 61e, a cam lever 61f, an actuating shaft 61g, and a cam spring 61h. The housing 61b is coupled to the seat rail 71, with gear teeth 61a being formed on an inner circumference of the housing 61b. The rotational center protrusions 61c are provided on the inner surface of the housing 61b. Each pawl tooth 61e is fitted around the rotational center protrusion 61c in such a way as to rotate about the rotational center protrusion 61c, with gear teeth 61d being formed on an outer circumference of the pawl tooth 61e to engage with the gear teeth 61a of the housing 61b. The cam lever 61f is rotatably disposed in a space which is defined between the pawl teeth member 61e to actuate the pawl teeth member 61e. The actuating shaft 61g is spline-coupled to the cam lever 61f while passing therethrough, and one end of the actuating shaft 61g passing through the housing 61b is integrally coupled with the dive bracket 62.

FIG. 7 shows the locked state in which the gear teeth 61a of the housing 61b engage with the gear teeth 61d of the pawl teeth member 61e. In the locked state, even if a passenger sits in the seat cushion 31, the dive bracket 62 does not rotate forwards from the state of FIG. 4 because of the engagement of the gear teeth 61a and 61d, so that the seat cushion 31 cannot perform the dive operation.

Meanwhile, if the seat cushion 31 moves forwards from the state of FIG. 4 and the dive bracket 62 rotates forwards from the state of FIG. 4 in conjunction with the forward movement of the seat cushion 31, the cam lever 61f rotates counterclockwise from the state of FIG. 7 by the rotation of the actuating shaft 61g coupled to the dive bracket 62.

Then, the pawl teeth member 61e rotate clockwise about the corresponding rotational center protrusions 61c, so that the gear teeth 61a of the housing 61b disengage with the gear teeth 61d of the pawl teeth member 61e, and thus the locked state of the dive locking unit 61 is released.

As such, if the locked state of the dive locking unit 61 is released, the seat cushion 31 moves forwards from the state of FIG. 4 under the load of a passenger, and simultaneously performs only the dive operation which moves downwards along the rotating radius of the dive bracket 62.

Further, the cam spring 61h provides a restoring force to the cam lever 61f, so that the cam spring 61h becomes ready to perform the subsequent operation.

The dive locking unit 61 shown in FIG. 7 uses the construction of a seat reclining device as one example. Since the dive locking unit 61 is not limited to the above construction, it may have various constructions as necessary.

Hereinafter, the operation of the seat according to the exemplary embodiment of the present invention will be described.

If a worker rotates the side seat back 21 forwards, the side seat back 21 rotates forwards about the second hinge shaft 42.

At this time, the actuating pin 52 comes into contact with the closed front of the actuating recess 51 to provide a force which is intended to rotate the center seat back 11 forwards. Simultaneously, as the first hinge shaft 41 rotates forwards along a rotating radius which has the second hinge shaft 42 as a center, the center seat back 11 and the seat cushion bracket 45 are integrally moved forwards.

The center seat back 11 is rotated forwards about the first hinge shaft 41 by the force of the actuating pin 52 and is thereby folded. Simultaneously, the side seat back 21 is rotated forwards about the second hinge shaft 42 to be folded. While the center seat back 11 and the side seat back 21 are folded, they move forwards.

As such, if the seat cushion bracket 45 moves forwards, the upper end of the dive bracket 62 coupled to the seat cushion 31 rotates forwards about the lower end of the dive bracket 62 coupled to the dive locking unit 61. As a result, the dive operation of the seat cushion 31 is also performed.

The dive bracket 62 may rotate as the locked state of the dive locking unit 61 is released. Since it has been described hereinbefore with reference to FIG. 7, the detailed description will be omitted.

Figure 8:
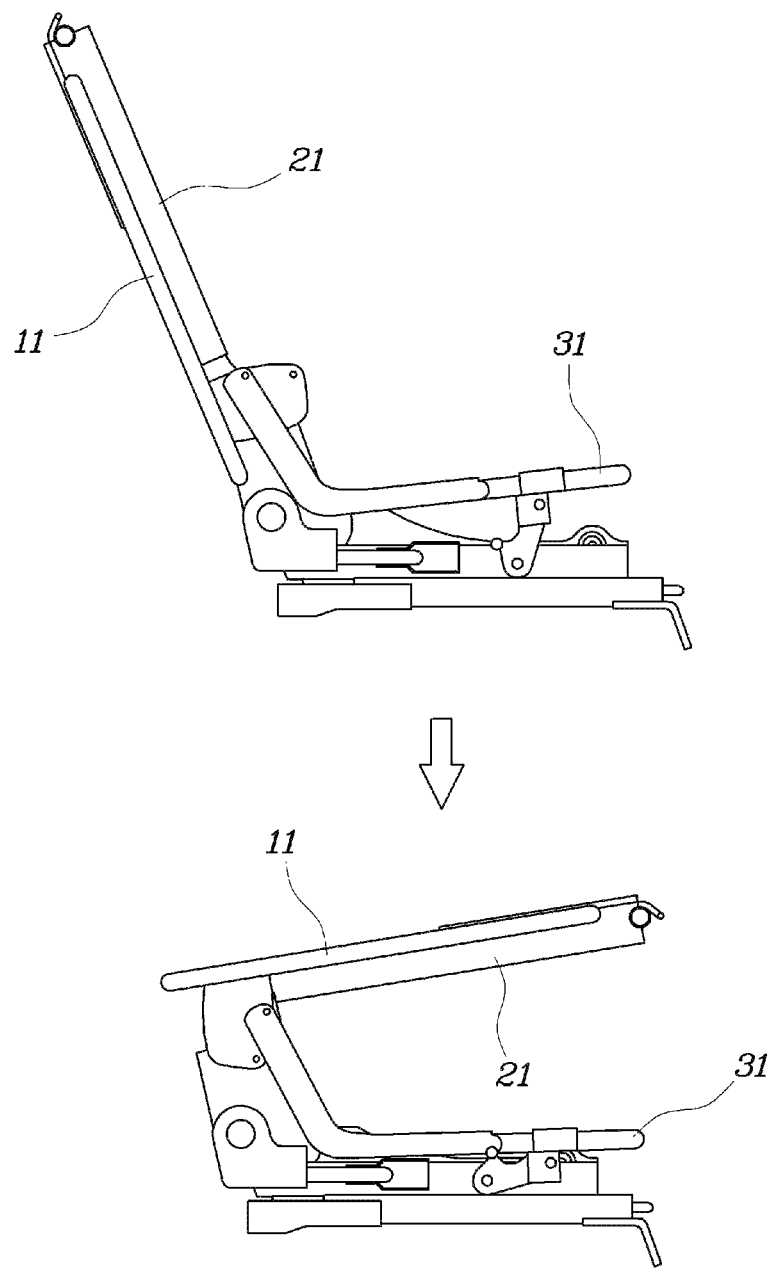
FIG. 8 is a side view of the seat for showing the state in which a dive operation of a seat cushion is performed together when a side seat back is folded.

Therefore, as shown in FIG. 8, the seat according to the exemplary embodiment of the present invention is constructed so that, when the side seat back 21 is folded, the center seat back 11 is folded along with the side seat back 21, and simultaneously, the dive operation of the seat cushion 31 is performed. The seat is advantageous in that the second row seat which has completed the folding operation and the dive operation can reduce a height from the floor panel to the upper surface of the folded seat back, so that it is easy to load goods.

Further, if a worker rotates only the center seat back 11 forwards, only the center seat back 11 rotates forwards about the first hinge shaft 41 to thereby be folded.

At this time, since the actuating pin 52 is removed from the actuating recess 51 through the open rear, it does not affect the folding operation of the side seat back 21. Further, since the first hinge shaft 41 and the second hinge shaft 42 are separated from each other, such a construction does not affect the folding operation of the side seat back 21.

Figure 9:
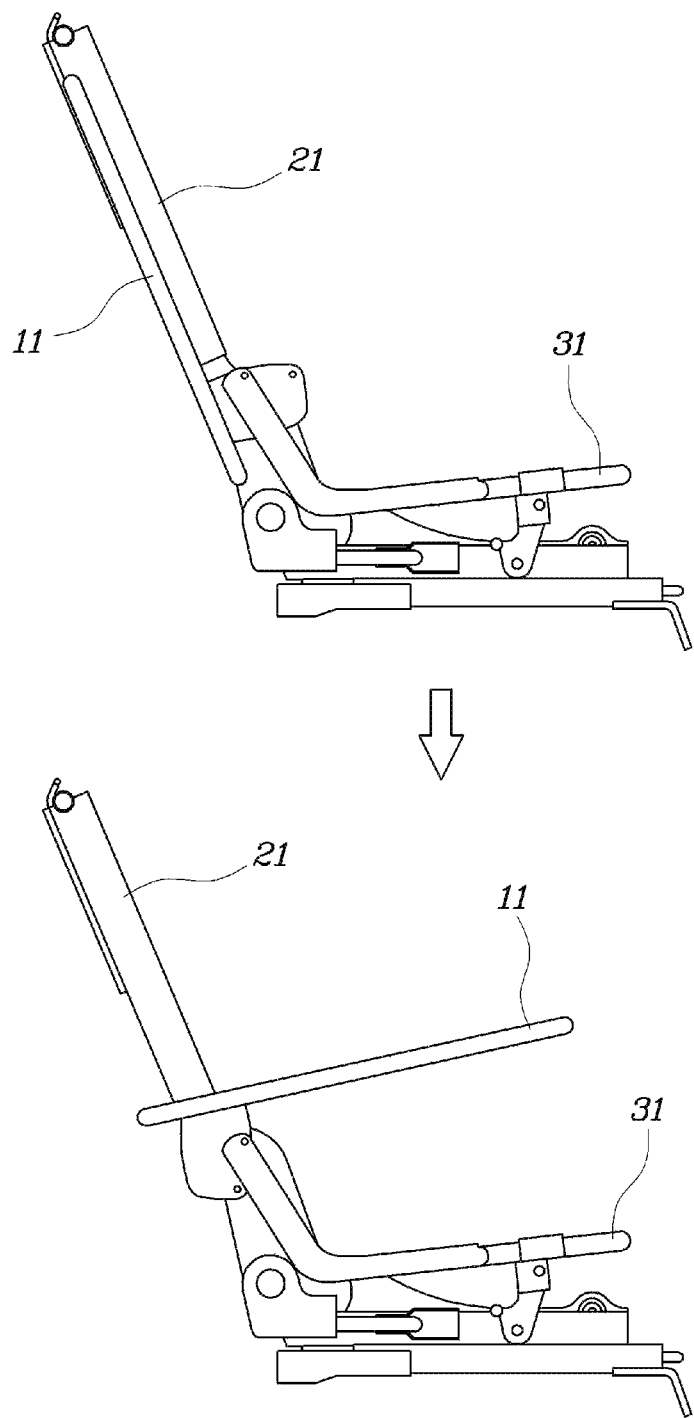
FIG. 9 is a side view of the seat for showing the state in which only a center seat back is folded.

Therefore, as shown in FIG. 9, the seat according to the exemplary embodiment of the present invention is constructed so that, when only the center seat back 11 rotates forwards, only the center seat back 11 rotates forwards about the first hinge shaft 41 to be folded, the side seat back 21 is not folded, and the dive operation of the seat cushion 31 is not performed, thus improving the riding comfort for an occupant sitting in the side seat 20.

Further, the seat according to the exemplary embodiment of the present invention is advantageous in that a support force between the center seat 10 and the side seat 20 is remarkably improved by the first and second hinge shafts 41 and 42 and the folding actuator assembly 50, thus considerably increasing the overall stability of the seat.

As described above, the present invention provides a seat for a vehicle, in which, when a side seat back is folded, a center seat back is folded together with the side seat back and a dive operation of a seat cushion is simultaneously performed, so that it is easy to load bulky goods on the folded seat back, and when only the center seat back rotates forwards, only the center seat back is folded and the dive operation of the seat cushion is not performed, thus improving the riding comfort for an occupant sitting in a side seat, and increasing a support force between a center seat and a side seat, therefore remarkably increasing the overall stability of the seat.

For convenience in explanation and accurate definition in the appended claims, the terms "upper", "lower", "inner", "outer", "front", and "rear" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat for a vehicle constructed so that a side seat is provided on an opposite side of a center seat, the seat comprising:
   a first hinge shaft to which a center seat back of the center seat is rotatably coupled for folding the center seat back forwards;
   a second hinge shaft to which a side seat back of the side seat is rotatably coupled for folding the side seat back forwards; and
   a folding actuator assembly selectively engaging the side seat back with the center seat back, wherein the folding actuator assembly locks the center seat back to the side seat back when the side seat back is folded, and releases the center seat back from the side seat back to fold only the center seat back when the center seat back is folded; and a dive actuator mounted to a seat rail between the seat rail and a seat cushion, the dive actuator being actuated to unlock the seat cushion from the seat rail when the seat cushion moves forwards while both the side seat back and the center seat back are folded together;

wherein the dive actuator includes:
   a dive locking unit mounted to the seat rail; and
   a dive bracket rotatably coupled at a first end thereof to the dive locking unit and rotatably coupled at a second end thereof to a front portion of the seat cushion, thus releasing a locked state of the dive locking unit when the seat cushion moves forwards while both the side seat back and the center seat back are folded together; and wherein the dive locking unit includes:
   a housing having gear teeth formed in an inner circumference thereof;
   a cam lever fixed to the first end of the dive bracket and rotatably engaged to the housing;
   a pawl teeth member having gear teeth and engaged between the inner surface of the housing and the cam lever; and
   a rotational center protrusion formed in the inner circumference of the housing,
   wherein the pawl teeth member is pivotally engaged with the rotational center protrusion, and
   wherein the cam lever selectively rotates the pawl teeth member while the cam lever is rotated by the dive bracket.

2. The seat as set forth in claim 1, wherein the first hinge shaft is rotatably coupled to a center bracket formed to a center seat bracket, a side bracket formed to the side seat back, and a seat cushion bracket formed to a seat cushion.

3. The seat as set forth in claim 2, wherein the seat cushion bracket is inserted between the center bracket and the side bracket.

4. The seat as set forth in claim 2, wherein:
the seat cushion bracket is integrated with the seat cushion, and
the seat cushion bracket is bent at a rear portion thereof upwards and then extends with a predetermined length to be inserted between the center bracket and the side bracket formed to a lower side of the side seat back.

5. The seat as set forth in claim 1, wherein the first hinge shaft and the second hinge shaft are not disposed co-axial.

6. The seat as set forth in claim 5, wherein the first hinge shaft is located behind and above the second hinge shaft with a predetermined distance.

7. The seat as set forth in claim 1, wherein the folding actuator assembly includes:
an actuating recess formed in an upper side of the center seat back; and
an actuating pin provided on an upper side of the side seat back, a first end thereof being selectively inserted into the actuating recess.

8. The seat as set forth in claim 7, wherein the actuating recess is formed in the upper side of the center seat back and located above the first hinge shaft.

9. The seat as set forth in claim 7, wherein a rear portion of the actuating recess is open and a front portion thereof is closed to selectively receive the first end of the actuating pin through the rear portion of the actuating recess.

10. The seat as set forth in claim 9, wherein, when the center seat back is folded forwards with respect to the side seat, the front end of the actuating pin is removed from the actuating recess through the open rear portion thereof, and
when the side seat back is folded forwards, the front end of the actuating pin comes into contact with the closed front portion of the actuating recess so that the side seat and the center seat are folded together.

11. The seat as set forth in claim 7, wherein a pin bracket is secured to the upper side of the side seat back which faces the actuating recess, and
the actuating pin is coupled to the pin bracket and a length of the actuating pin protruding from the pin bracket is adjustable.

12. The seat as set forth in claim 11, wherein an end of the pin bracket is threaded and secured to the upper side of the side seat back.

\* \* \* \* \*